(12) United States Patent
Matsunaga

(10) Patent No.: US 6,826,293 B2
(45) Date of Patent: Nov. 30, 2004

(54) IMAGE PROCESSING DEVICE, SINGULAR SPOT DETECTION METHOD, AND RECORDING MEDIUM UPON WHICH SINGULAR SPOT DETECTION PROGRAM IS RECORDED

(75) Inventor: Shinichi Matsunaga, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 631 days.

(21) Appl. No.: 09/813,954

(22) Filed: Mar. 22, 2001

(65) Prior Publication Data

US 2001/0024514 A1 Sep. 27, 2001

(30) Foreign Application Priority Data

Mar. 22, 2000 (JP) .................................... P2000-080935

(51) Int. Cl.$^7$ ................................................ G06K 9/00
(52) U.S. Cl. ........................ 382/106; 382/266; 382/153; 382/154; 382/285
(58) Field of Search ............................... 382/106, 107, 382/108, 151, 153, 154, 199, 201, 197, 266, 278, 321, 274, 162, 285, 209, 168; 375/240.16; 345/863, 419; 356/3.03, 3; 348/113, 114

(56) References Cited

U.S. PATENT DOCUMENTS

| | | | | |
|---|---|---|---|---|
| 5,615,003 A | * | 3/1997 | Hermary et al. | 356/3.03 |
| 5,694,483 A | * | 12/1997 | Onoguchi | 382/154 |
| 5,748,778 A | * | 5/1998 | Onoguchi | 382/199 |
| 5,761,326 A | * | 6/1998 | Brady et al. | 382/103 |
| 5,867,592 A | * | 2/1999 | Sasada et al. | 382/154 |
| 6,111,580 A | * | 8/2000 | Kazama et al. | 345/863 |
| 6,160,900 A | * | 12/2000 | Miyawaki et al. | 382/107 |
| 6,385,245 B1 | * | 5/2002 | De Haan et al. | 375/240.16 |

FOREIGN PATENT DOCUMENTS

| JP | A6176107 | 6/1994 |
|---|---|---|
| JP | A7271978 | 10/1995 |

* cited by examiner

Primary Examiner—Bhavesh M. Mehta
Assistant Examiner—Seyed Azarian
(74) Attorney, Agent, or Firm—Birch, Stewart, Kolasch & Birch, LLP

(57) ABSTRACT

This image processing device comprises a distance image capture device which captures a distance image based upon three dimensional coordinate values obtained for various points upon object surfaces by a distance sensor; a plane detection device which detects planes from said three dimensional coordinate values upon said object surfaces obtained from said distance image; an edge detection device which detects edges from said distance image; a singular spot decision device which decides whether or not said edges include singular spots, according to whether or not the edges which have been detected by said edge detection device and the planes which have been detected by said plane detection device satisfy predetermined conditions; and a singular spot map storage device which stores said singular spots, based upon the results from said singular spot decision device.

10 Claims, 7 Drawing Sheets

HORIZONTAL PLANE MASK

VERTICAL PLANE MASK

IMAGE PROCESSING DEVICE, SINGULAR SPOT DETECTION METHOD, AND RECORDING MEDIUM UPON WHICH SINGULAR SPOT DETECTION PROGRAM IS RECORDED

BACKGROUND OF THE INVENTION

1. Field of the Invention

The present invention relates to an image processing device, a singular spot detection method, and a recording medium upon which a singular spot detection program is recorded, which, using a distance image, perform the detection of singular spots which is necessary when a robot or a vehicle moves.

2. Description of Related Art

For an autonomous robot or a self propelled vehicle to perform movement safely, it is necessary to detect special environmental structures such as intersections or descending steps or the like. In order to do this, a radar unit or the like is often provided to the robot or vehicle, and movement control is then performed from information about the surrounding environment which is obtained by this radar unit. However, if self-control of movement is to be performed from the detected information, it is necessary to ensure that the detected information is correct and does not include any unnecessary information.

However, since the surrounding environment when a robot or a vehicle moves is complicated, the processing for only extracting information which is accurate and also applicable becomes extremely complicated, and the problem arises that it is necessary to provide several means for detecting the surrounding environment.

The present invention has been conceived in view of this sort of circumstance, and its objective is to propose an image processing device, a singular spot detection method, and a recording medium upon which a singular spot detection program is recorded, which can perform the detection of singular spots which is required for movement control when a robot or vehicle moves autonomously.

SUMMARY OF THE INVENTION

The invention of the first aspect comprises: a distance image capture device (for example, the distance image capture section 1 of the embodiment) which captures a distance image based upon three dimensional coordinate values obtained for various points upon object surfaces by measuring the distances to the points upon the object surfaces in the forward visual field of a distance sensor; a plane detection device (for example, the plane detection section 3 of the embodiment) which detects planes from the three dimensional coordinate values upon the object surfaces obtained from the distance image; an edge detection device (for example, the edge detection section 4 of the embodiment) which detects edges from the distance image; a singular spot decision device (for example, the singular spot decision section 5 of the embodiment) which decides whether or not the edges include singular spots, according to whether or not the edges which have been detected by the edge detection device and the planes which have been detected by the plane detection device satisfy predetermined conditions; and a singular spot map storage device (for example, the singular spot map storage section 7 of the embodiment) which stores the singular spots, based upon the results from the singular spot decision device.

According to the invention of the first aspect, since edge detection processing is performed upon the distance image and sudden changes of distance are detected, thereby it becomes possible to detect singular spots such as intersections or descending steps or the like at high speed. Further, it becomes possible to enhance the accuracy of detection of singular spots, since the spots on these edges are taken as singular spots only when the edges which have been detected by the edge detection and the planes which have been detected by the plane detection satisfy predetermined conditions. Yet further, since it is arranged that the edge detection and the plane detection are processed in parallel, thereby the benefit is obtained that it is possible to enhance the speed of detection processing for the singular spots.

The invention of the second aspect is a vehicle movement control device comprising an image processing device according to the first aspect, wherein the vehicle movement control device comprises a movement control device (for example, the movement control section 8 of the embodiment) which, during vehicle movement, performs movement control by referring to the singular spot map.

According to the invention of the second aspect, since it is arranged that the movement of the vehicle is controlled while referring to the singular spot map, thereby, along with it being possible to perform control of the position of the vehicle with good accuracy, the advantage is obtained that it becomes possible to control the generation of the movements necessary when approaching a singular spot.

The invention of the third aspect is an autonomously moving robot comprising an image processing device according to the first aspect, wherein the autonomously moving robot comprises a movement control device (for example, the movement control device 8 of the embodiment) which, during robot movement, performs movement control by referring to the singular spot map.

According to the invention of the third aspect, since it is arranged that the movement of the robot is controlled while referring to the singular spot map, thereby, along with it being possible to perform control of the position of the robot with good accuracy, the advantage is obtained that it becomes possible to control the generation of the movements necessary when approaching a singular spot.

The invention of the fourth aspect comprises: distance image capture processing which captures a distance image based upon three dimensional coordinate values obtained for various points upon object surfaces by measuring the distances to the points upon the object surfaces in the forward visual field of a distance sensor; plane detection processing (for example, the step S1 of the embodiment) which detects planes from the three dimensional coordinate values upon the object surfaces obtained from the distance image; edge detection processing (for example, the step S2 of the embodiment) which detects edges from the distance image; and singular spot decision processing (for example, the step S5 of the embodiment) which decides whether or not the edges include singular spots, according to whether or not the edges which have been detected by the edge detection device and the planes which have been detected by the plane detection device satisfy predetermined conditions.

According to the invention of the fourth aspect, since edge detection processing is performed upon the distance image and sudden changes of distance are detected, thereby it becomes possible to detect singular spots such as intersections or descending steps or the like at high speed. Further, it becomes possible to enhance the accuracy of detection of singular spots, since the spots on these edges are taken as singular spots only when the edges which have been detected by the edge detection and the planes which have been detected by the plane detection satisfy predetermined conditions. Yet further, since it is arranged that the edge detection and the plane detection are processed in parallel, thereby the benefit is obtained that it is possible to enhance the speed of detection processing for the singular spots.

The invention of the fifth aspect is a recording medium which can be read by a computer, upon which is recorded a singular spot detection program which detects singular spots in a forward visual field, wherein the singular spot detection program causes the computer to perform: distance image capture processing which captures a distance image based upon three dimensional coordinate values obtained for various points upon object surfaces by measuring the distances to the points upon the object surfaces in the forward visual field of a distance sensor; plane detection processing (for example, the step S1 of the embodiment) which detects planes from the three dimensional coordinate values upon the object surfaces obtained from the distance image; edge detection processing (for example, the step S2 of the embodiment) which detects edges from the distance image; and singular spot decision processing (for example, the step S5 of the embodiment) which decides whether or not the edges include singular spots, according to whether or not the edges which have been detected by the edge detection device and the planes which have been detected by the plane detection device satisfy predetermined conditions.

According to the invention of the fifth aspect, since edge detection processing is performed upon the distance image and sudden changes of distance are detected, thereby it becomes possible to detect singular spots such as intersections or descending steps or the like at high speed. Further, it becomes possible to enhance the accuracy of detection of singular spots, since the spots on these edges are taken as singular spots only when the edges which have been detected by the edge detection and the planes which have been detected by the plane detection satisfy predetermined conditions. Yet further, since it is arranged that the edge detection and the plane detection are processed in parallel, thereby the benefit is obtained that it is possible to enhance the speed of detection processing for the singular spots.

DETAILED DESCRIPTION OF THE INVENTION

In the following, an image processing device according to an embodiment of the present invention will be explained with reference to the figures.

Figure 1:
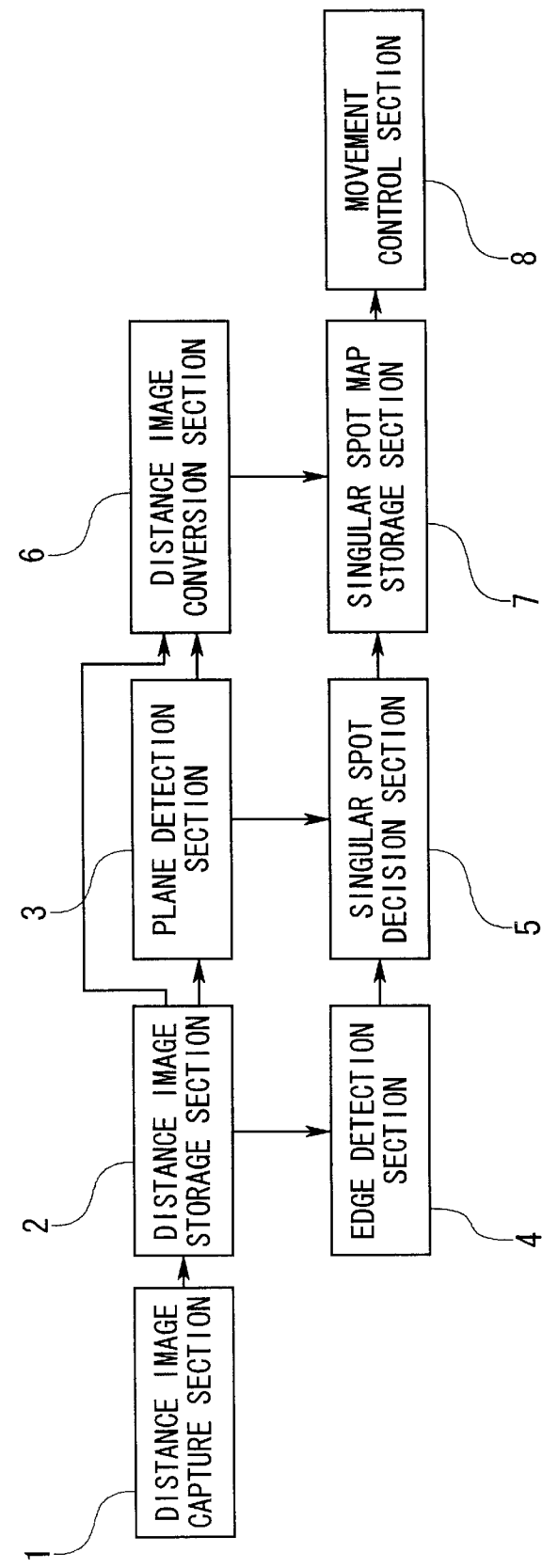
FIG. 1 is a block diagram showing the structure of an embodiment of the present invention.

FIG. 1 is a block diagram showing the structure of this embodiment. In this figure, the reference symbol 1 is a distance image capture section which captures a distance image of the bodies which are present in a visual field along a direction of movement in which a robot or vehicle is moving. A distance sensor of this distance image capture section 1 comprises two CCD cameras or radar units which employ electromagnetic waves. The reference symbol 2 is a distance image storage section which stores one frame of the distance image which has been taken by the distance image capture section 1. The reference symbol 3 is a plane detection section which processes a distance image stored in the distance image storage section 2 and detects planes therein.

The reference symbol 4 is an edge detection section which processes a distance image stored in the distance image storage section 2 and detects edges therein. The reference symbol 5 is a singular spot decision section which decides upon singular spots, based upon the detection results of the plane detection section 3 and the edge detection section 4. The reference symbol 6 is a distance image conversion section which, referring to the plane detection results, converts from the distance image to a plan view which is used in a singular spot map. The reference symbol 7 is a singular spot map storage section which stores a singular spot map which is created based upon the plan view which has been formed by the distance image conversion section 6 and the decision results of the singular spot decision section 5. And the reference symbol 8 is a movement control section which controls the movement of a robot or a vehicle or the like by referring to the singular spot map.

Herein, the image processing device shown in FIG. 1 will be explained in terms of its being equipped to an autonomously moving robot which moves within a room.

Here, it will be supposed that a coordinate system as explained below is being used. The distance direction forward from the robot will be taken as the X axis, the direction to the left and right of the robot will be taken as the Y axis, and the vertical direction will be taken as the Z axis, with these three axes being mutually perpendicular. Further, the quantities termed distances below are straight line distances from the distance image capture section 1 to various objects. Accordingly, the distance image data are collections of 3 dimensional coordinate values of points upon surfaces of objects sensed in the visual field of the distance image capture section 1.

Figure 2:
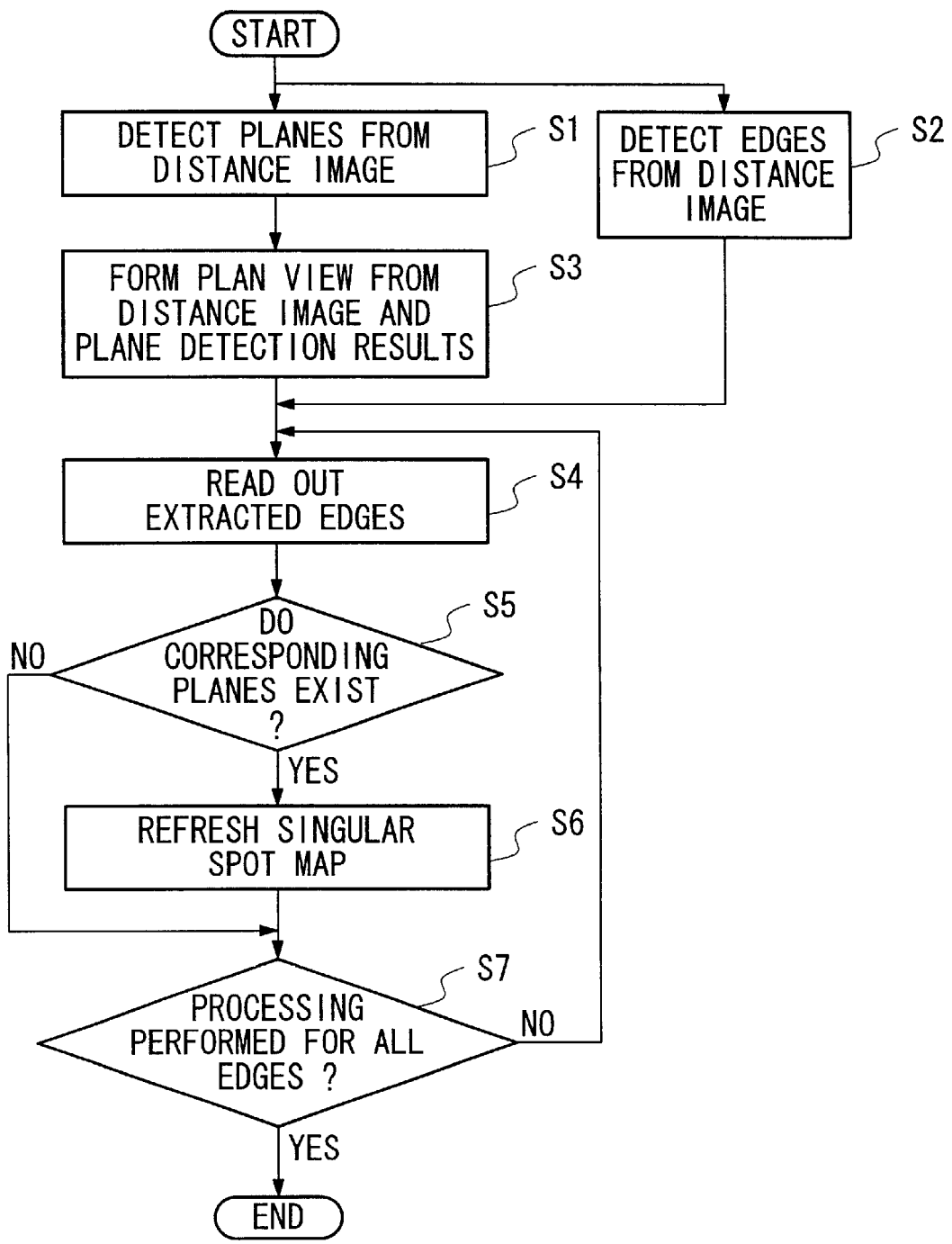
FIG. 2 is a flow chart showing the operation of an image processing device shown in FIG. 1.

Next, the operation of the image processing device shown in FIG. 1 will be explained with reference to the figures. FIG. 2 is a flow chart showing the operation of the image processing device shown in FIG. 1.

First, the distance image capture section 1 captures a distance image, A/D converts this data, and stores it in the distance image storage section 2 for each point sensed. Here, as one example, the distances of the points which are sensed will be supposed to be expressed as 8 bit values (i.e., by 256 levels). Although the pixels of a normal image are values which specify the brightness of the surface of an object which is present in the visual field of a sensor, by contrast, the pixels of a distance image are values which specify by 256 levels the distance of the surface of an object which is present in the visual field of the sensor.

Figure 3:
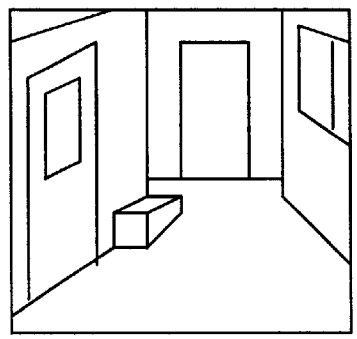
FIG. 3 is an explanatory figure showing an example of a scene in the forward visual field of a robot.

Accordingly, it is possible to specify a single point in the Y-Z plane according to the position of the pixel in the distance image, and moreover it is possible to specify a single point upon the surface of an object which is present in three dimensional space, since it is possible to specify the position of the X axis direction according to the distance information possessed by this pixel. It should be noted that, if greater accuracy is required, it is also possible to enhance the accuracy by combining radar units, or the like. Furthermore, it would also be acceptable to use the output values of the distance sensor just as they are, without expressing the distance data by 256 levels. Here an example of the scene in the forward visual field of the robot is shown in FIG. 3, in order to hypothesize the positional relationships of the robot at the present time point. As shown in FIG. 3, the robot is supposed to be approaching the position of an intersection where a hallway forks into the shape of a letter "T".

Figure 4:
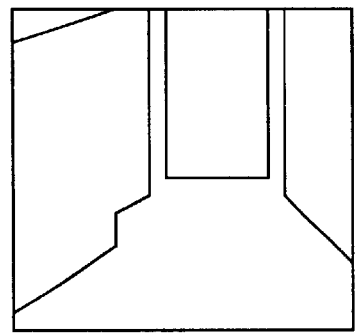
FIG. 4 is an explanatory figure showing an example of a plane detection image which has been formed by a plane detection section 3 shown in FIG. 1.

Next, after the distance image has been stored in the distance image storage section 2, the plane detection section 3 reads out the distance image which is stored in the distance image storage section 2, and processes this distance image and (in the step S1) performs detection of planes. Although a detailed explanation of this plane detection processing will be given hereinafter, it is possible to utilize per se known processing methods without being limited to the detection processing described hereinafter. The image of plane detection results shown in FIG. 4 is obtained within the plane detection section 3, according to this plane detection processing. The planes detected by this processing are given by Equation (1).

$$a_k x + b_k y + c_k z = d_k \qquad (1)$$

where k is an index for distinguishing the planes from one another.

Figure 5:
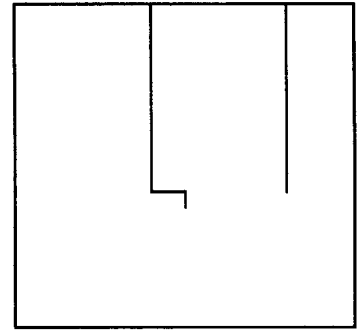
FIG. 5 is an explanatory figure showing an example of an edge detection image which has been formed by an edge detection section 4 shown in FIG. 1.

On the other hand, in parallel with the processing of the plane detection section 3, the edge detection section 4 reads in the same distance image as the distance image which was read in by the plane detection section 3, and processes this distance image and (in the step S2) performs edge detection. In image processing for a normal brightness image, processing is performed which extracts spots of abrupt change of brightness as edges; but, in edge detection for a distance image, spots where the distance abruptly changes are extracted as edges. For this edge detection processing, it is possible to use per se known image processing techniques for brightness images: for example, a two value image may be formed for edge detection by using a Sobel filter upon the distance image, and, further, line portions may be extracted using Hough conversion upon this two value image. The image of edge detection results shown in FIG. 5 is obtained in the edge detection section 4 by this edge detection processing. Further, the direction vectors $n=(x_j, y_j, z_j)$ of the extracted line segments, and some points $P_{j0}=(x_0, y_0, z_0)$ upon the extracted line segments, are obtained by this processing.

Figure 6:
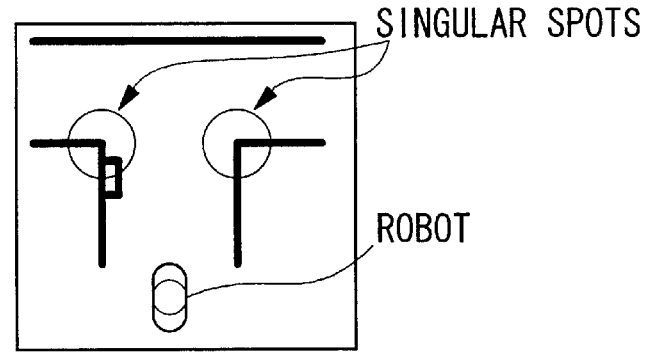
FIG. 6 is an explanatory figure showing an example of a singular spot map which is stored in a singular spot map storage section 7 shown in FIG. 1.

Next, the distance image conversion section 6 forms a plan view (in the step S3) from the distance image which is stored in the distance image storage section 2 and the results of plane detection by the plane detection section 3. Here, by a plan view is meant an image which shows the positional relationships as seen from the front upper side of the robot, and it is made by projecting the points which are sensed into the X-Y plane. An example of an image of a plan view obtained by this processing is shown in FIG. 6. As shown in this figure, the plan view image is an image which is able to express the arrangement of the hallway and the position of the robot itself.

Next, the singular spot decision section 5 reads out (in the step S4) the edge information maintained in the edge detection section 4 one item at a time. And the singular spot decision section 5 decides (in the step S5) whether or not any plane which corresponds to this read out edge is being kept in the plane detection section 3. This decision is made according to whether or not the Equations (2) and (3) are satisfied.

$$|a_k x_j + b_k y_j + c_k z_j| \leq \epsilon_v \qquad (2)$$

$$|a_k x_0 + b_k y_0 + c_k z_0 - d_k| \leq \epsilon_p \qquad (2)$$

where $\epsilon_v$ and $\epsilon_p$ are threshold values, and are values near zero.

If Equation (2) is satisfied, then this means that the direction vector of the extracted line segment and the normal vector to the plane are at 90°, i.e. are perpendicular. Further, if Equation (3) is satisfied, this means that each point upon the extracted line segment lies upon a plane which is defined by the above Equation (1).

If the result of this decision is that no corresponding plane exists, then the flow of control is transferred to the step S7. On the other hand, if a corresponding plane does exist, then the singular spot decision section 5 obtains its position from the information about the corresponding plane and the edge, and refreshes (in the step S6) the singular spot map formed by the distance image conversion section 6 by mapping this obtained position as a singular spot upon the singular spot map. The singular spot map mapped in this manner is shown in FIG. 6.

Next, the singular spot decision section 5 decides (in the step S7) whether or not processing has been performed for all of the edges which have been detected by the edge detection section 4, and if all such processing has not yet been performed then the flow of control returns to the step S4 and processing is repeated. On the other hand, if processing has been performed for all the edges, then singular spot detection processing is terminated. The distance image capture section 1 is informed of the fact that this episode of singular spot detection processing has been completed, and captures another distance image, and stores the result thereof in the distance image storage section 2. And the processing of the steps S1 through S7 described above is performed again. By doing this, the singular spot map is refreshed along with the movement of the robot.

Since edge detection processing for the distance image is implemented in this manner, and it is arranged to detect abrupt changes of distance, thereby it becomes possible to detect singular spots, such as intersections or descending steps or the like, at high speed. Further, since the spots on these edges are only identified as singular spots when the edges which have been detected by the edge detection, and the planes which have been detected by the plane detection, have satisfied predetermined conditions, thereby it becomes possible to increase the accuracy of detection of singular spots. Furthermore, since it is arranged for the processing for the edge detection and the processing for the plane detection to be performed in parallel, thereby it is possible to increase the speed of the detection processing for the singular spots.

On the other hand, the movement control section 8, while referring to the contents of the singular spot map storage section 7 which is recurrently refreshed moment by moment, along with performing setting of the movement path by discriminating the singular spots, also performs control of the movement of the robot by reducing the speed of its movement when in the neighborhood of the singular spots, and the like. By reducing the speed of movement when in the neighborhood of an intersection in this manner, it becomes easy to promote avoidance of collisions at the moment of encounter and the like, so that it is possible to control the vehicle speed and the like according to the structure of the surrounding environment.

Figure 7:
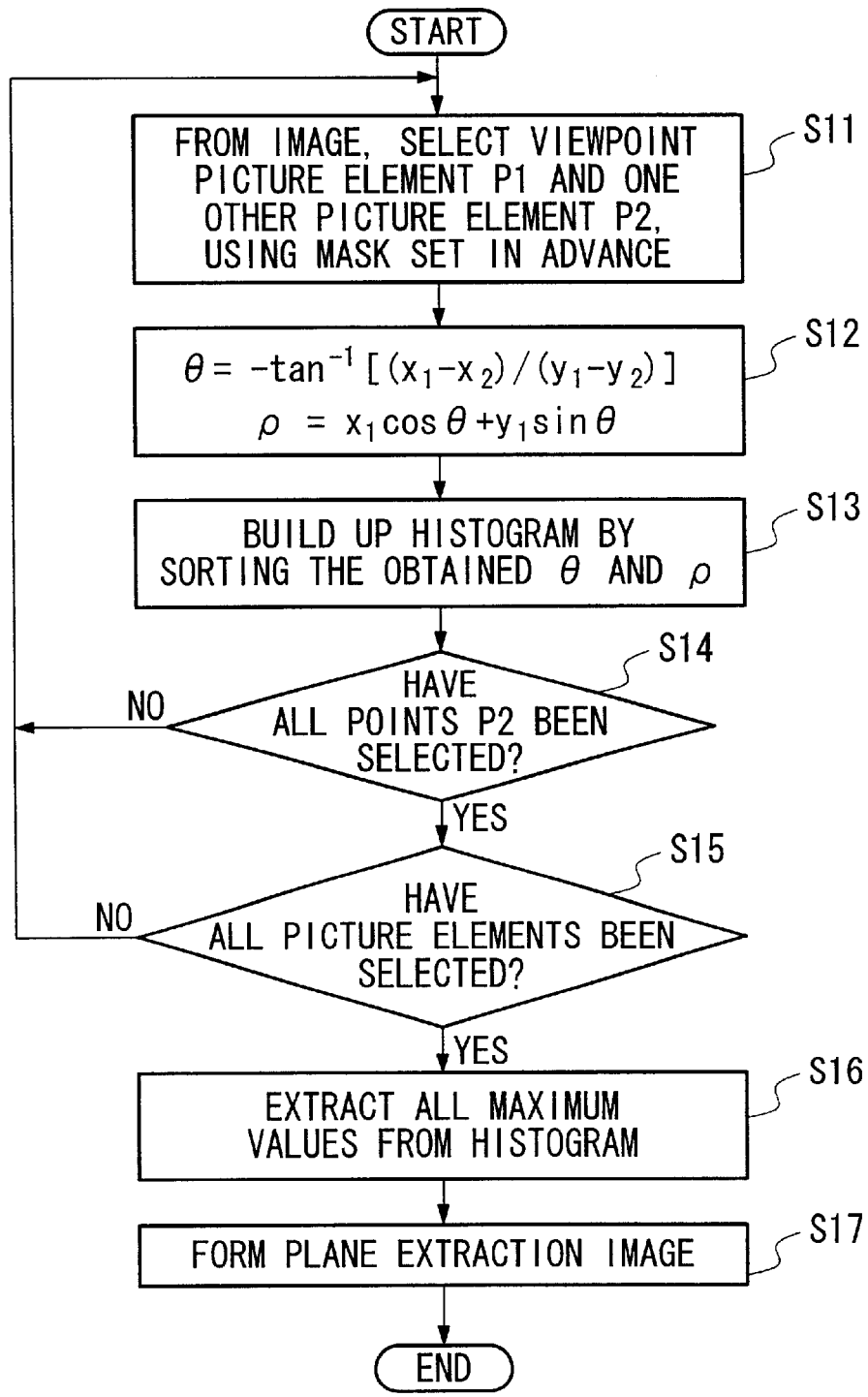
FIG. 7 is a flow chart showing the operation of the plane detection section 3 shown in FIG. 1.
Figure 9B:
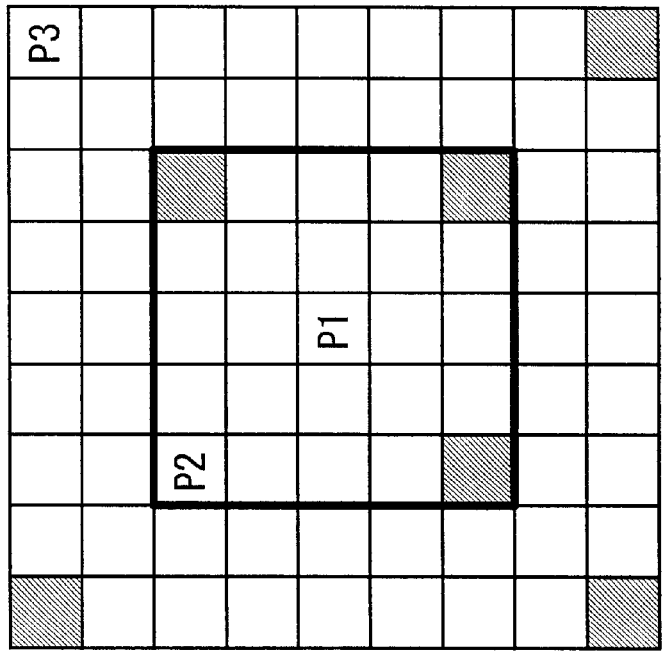
FIGS. 9A and 9B are explanatory figures showing an example of a mask which is used by the plane detection section 3 shown in FIG. 1.
Figure 9A:
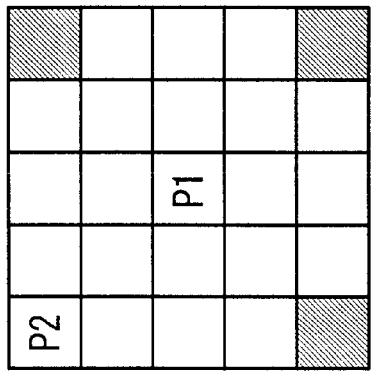

Next, the operation of the plane detection section 3 for detecting planes will be explained. FIG. 7 is a flow chart showing the operation by which the plane detection section 3 extracts vertical planes which correspond to walls from the distance image. The plane detection section 3 reads out one frame of distance data, and (in the step S12) selects, using a mask which is set in advance, a viewpoint (target) pixel in the image (shown here by P1) and one other pixel (shown here by P2). An example of a mask used in this step S12 is shown in FIG. 9A. As shown in this figure, the vertical plane mask is made up of 5×5 pixels, and the central one of these elements is the point P1, while the elements at its four corners become points P2 in turn.

Next, the plane detection section 3 derives (in the step S12) the parameters θ and ρ in the Hough space from the two points P1 ($x_1$, $y_1$, $z_1$) and P2 ($x_2$, $y_2$, $z_2$) which have been selected by this mask, according to Equations (4) and (5).

$$\theta = -\tan^{-1}[(x_1-x_2)/(y_1-y_2)] \quad (4)$$

$$\rho = x_1 \cos\theta + y_2 \sin\theta \quad (5)$$

As shown by Equations (4) and (5), the parameters θ and ρ are calculated only from the X components and the Y components, without using the Z components. Since the processing shown in FIG. 7 is processing for extracting vertical planes such as walls and the like, it is possible for it to ignore the Z components. In particular, inside a room, since almost all the planes are vertical ones, it is possible to minimize the influence exerted upon the results of plane extraction processing even if the Z components are ignored. Accordingly, it is possible to extract the vertical planes in three dimensional space by projecting the points sensed upon the surfaces of bodies, which have three dimensional coordinate values, into the X-Y plane, and by extracting straight lines in the X-Y plane from the points which are thus projected. Here, the parameter θ which is extracted according to Equations (1) and (2) is the angle around a vertical axis of the straight line which is being extracted, while the parameter ρ is the distance between this straight line and the origin.

Figure 10:
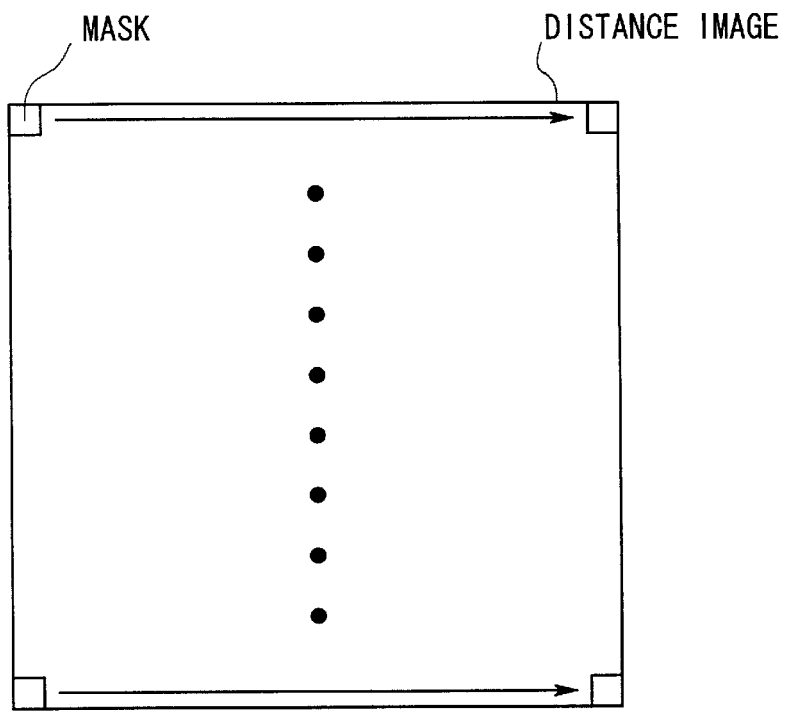
FIG. 10 is an explanatory figure showing an example of the scanning direction for a distance image, for processing by the plane detection section 3 shown in FIG. 1.

Next, the plane detection section 3 sorts (ballots) (in the step S13) the parameters θ and ρ which were obtained in the step S12 into a three dimensional histogram. And next the plane detection section 3 performs (in the step S14), with the same point P1, the processing of the steps S11 through S13 for the other three points P2 (the positions shown by the diagonal hatching in FIG. 9A). And then the plane detection section 3, using the mask shown in FIG. 9A, repeats (in the step S15) the processing of the steps S11 through S13 while, as shown in FIG. 10, shifting the position of P1 by one pixel at a time through the entire distance image, from the position at the upper left of the distance image to the position in its lower right. A three dimensional histogram is built up by this processing.

Next, in the step S16, the plane detection section 3 refers to the three dimensional histogram and extracts all the occurrences of maximum values. And it obtains the parameters θ and ρ which have these extremely large extracted values, and specifies straight lines upon the X-Y plane from these θ and ρ. Accordingly, the number of these straight lines thus specified is the same as the number of maximum values. It should be understood that, in this extraction of maximum values, it would also be acceptable to extract only those maximum values which were greater than some particular value.

Next, according to whether or not the points which have been projected into the X-Y plane from the points having three dimensional coordinate values which were sensed are points upon the straight lines which have previously been specified, the plane detection section 3 decides whether or not these sensed points are points upon planes. And it extracts vertical planes in the distance image by performing this decision upon each of the specified straight lines in turn, and from these results it forms (in the step S17) a plane extraction image. It would also be acceptable for this plane extraction image to be formed by classifying the sensed points which lie upon the same straight lines into each of the specified straight lines, or the like. By this processing, a plane extraction image is obtained in which only the vertical planes are picked out, and the portions which are not vertical planes are not picked out.

Figure 8:
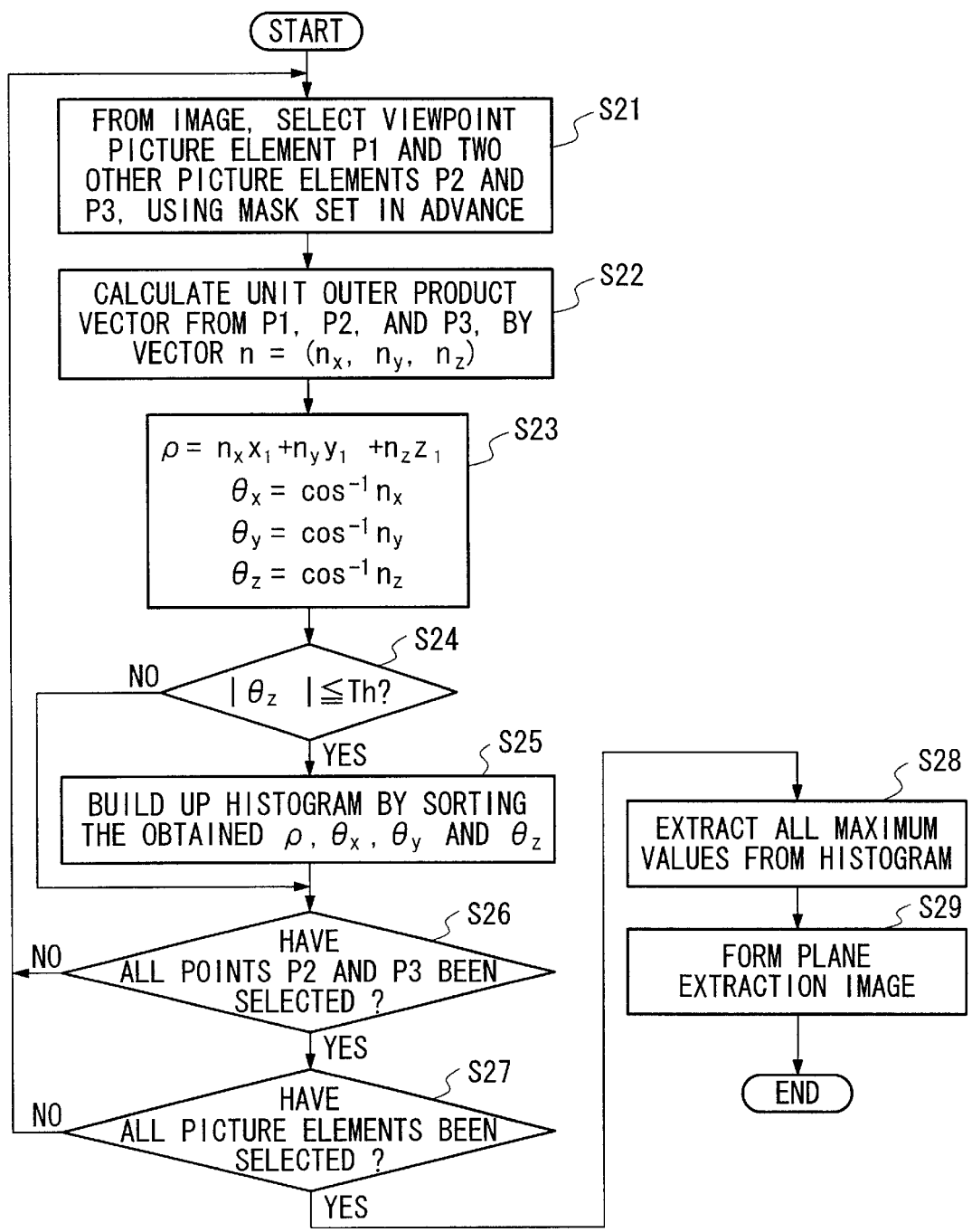
FIG. 8 is a flow chart showing the operation of the plane detection section 3 shown in FIG. 1.

Next, referring to FIG. 8, the operation of the plane detection section 3 for extracting a horizontal plane which corresponds to a floor or the like will be explained. FIG. 8 is a flow chart showing the operation of the plane detection section 3 for extracting this horizontal plane. By horizontal plane here is meant a floor surface or road surface, and this includes a floor surface or road surface which has a realistic slope (for example, a maximum slope of 10°).

First, after the distance image has been stored in the distance image storage section 2, the plane detection section 3 reads out one frame of distance data, and (in the step S21) selects, using a mask which is set in advance, a viewpoint pixel in the image (shown here by P1) and two other pixels (shown here by P2 and P3). An example of a mask used in this step S21 is shown in FIG. 9B. As shown in this figure, the horizontal plane mask is made up of 9×9 pixels, and its central 5×5 pixel portion is the same as the vertical plane mask shown in FIG. 9A, while moreover the elements at the four corners of the 9×9 pixels of this mask become elements P3 in turn.

Next, the plane detection section 3 derives (in the step S22) the unit outer product vector n from the three points P1 ($x_1$, $y_1$, $z_1$), P2 ($x_2$, $y_2$, $z_2$) and P3 ($x_3$, $y_3$, $z_3$) which have been selected by this mask, according to Equations (6) and (7). In the explanation of the following Equations, the expression "vector n" will be used for the vector.

The unit outer product vector n is obtained by first obtaining an outer product vector n-tmp according to Equation (6), and by then normalizing it according to Equation (7).

Outer product vector $n_{tmp} = ((y_2-y_1)(z_3-z_1)-(z_2-z_1)(y_3-y_1),$ $(z_2-z_1)(x_3-x_1)-(x_2-x_1)(z_3-z_1),$ $$(y_2-y_1)(z_3-z_1)-(z_2-z_1)(y_3-y_1)) \quad (6)$$

$$\text{Unit outer product vector } n = \text{vector } n_{tmp}/|\text{vector } n_{tmp}| \quad (7)$$

The unit outer product vector n normalized according to Equation (7) whose magnitude is 1 becomes the unit outer product vector $n=(n_x, n_y, n_z)$, and this vector is the vector perpendicular to the plane which is determined by the three points selected previously.

Next, the plane detection section 3 derives (in the step S23) parameters ρ, θx, θy and θz from this unit outer product vector n which has been obtained, according to Equations (8), (9), (10), and (11).

$$\rho = n_x x_1 + n_y y_1 + n_z z_1 \quad (8)$$

$$\theta x = \cos^{-1} n_x \quad (9)$$

$$\theta y = \cos^{-1} n_y \quad (10)$$

$$\theta z = \cos^{-1} n_z \quad (11)$$

Here, the parameter ρ is the distance from the origin to the plane which is being extracted, while the parameters θx, θy and θz are the respective angles which correspond to the direction cosines for each component of the perpendicular vector.

Next, the plane detection section 3 decides (in the step S24) whether or not the angle θz which corresponds to the direction cosine of the Z component of the perpendicular vector satisfies the condition the following condition.

$$|\theta z| \leq Th$$

Th is a threshold value, and is the maximum angle for the slope of the floor surface or road surface. Since usually the floor surface in a room, even if it slopes, has a maximum angle of around 10°, therefore it is desirable to set this value Th to about 10°.

Next, if in the step S24 the condition $|\theta z| \leq Th$ is satisfied, then the plane detection section 3 sorts (in the step S25) the parameters $\rho$, $\theta x$, $\theta y$ and $\theta z$ which were obtained in the step S23 into a four dimensional histogram. On the other hand, if the condition $|\theta z| \leq Th$ is not satisfied, then the flow of control is transferred to the step S26.

Next, the plane detection section 3 performs (in the step S26) the processing of the steps S21 through S25 for the same point PI but, in turn, for the other three points P2 and the respective other three points P3 (at the positions shown by the diagonal hatching in FIG. 9B). Moreover, using the mask shown in FIG. 9B, as shown in FIG. 10, the plane detection section 3 shifts (in the step S27) the position of P1 through the entire distance image by one pixel at a time, from the upper left position in the distance image to its lower right position, and repeats the processing of the steps S21 through S26. A four dimensional histogram is built up by this processing. However, the sorting is only performed when $|\theta z| \leq Th$ is satisfied.

Next (in the step S28) the plane detection section 3 refers to the four dimensional histogram, and extracts all the maximum values. And it obtains the parameters $\rho$, $\theta x$, $\theta y$ and $\theta z$ which have these extremely large extracted values, and specifies planes in three dimensional space from these $\rho$, $\theta x$, $\theta y$ and $\theta z$. Accordingly, the number of these planes thus specified is the same as the number of maximum values.

It should be understood that, in this extraction of maximum values, it would also be acceptable to extract only those maximum values which were greater than some particular value.

Next, the plane detection section 3 forms (in the step S29) a plane extraction image from the horizontal planes which have been thus specified. It would also be acceptable for this plane extraction image to be formed by classifying the points sensed which lie upon the specified planes into each of the specified colors, or the like. By this coloring processing, a plane extraction image is obtained in which only the horizontal planes are colored, and the portions which are not horizontal planes are not colored.

Figure 11:
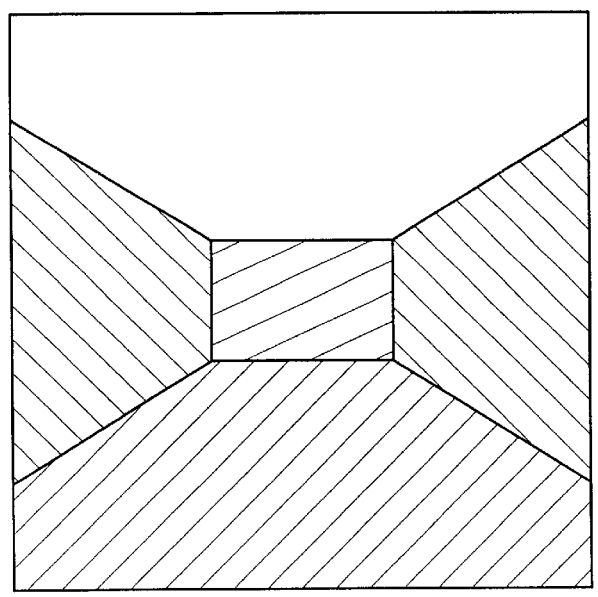
FIG. 11 is an explanatory figure showing an example of a plane detection image which has been formed by the plane detection section 3 shown in FIG. 1.

It should be noted that it would also be acceptable for the vertical plane extraction processing shown in FIG. 7 and the horizontal plane extraction processing shown in FIG. 8 to operate simultaneously and for their results to be combined together, so that a plane extraction image was formed from the vertical and horizontal planes which were thus classified. Further, it would also be acceptable for the distance image capture section 1 to capture another distance image at the time point at which the plane detection section 3 has completed the reading out of the distance data which is stored in the distance image storage section 2, thereby to renew the contents of the distance image storage section 2. The plane detection image is renewed by repeating the above described processing. An example of the plane detection image is shown in FIG. 11.

Since in this manner, when detecting vertical planes, the Z components are not used but rather calculation is performed using only the X and Y components, and it is arranged that the vertical planes which correspond to walls are extracted by specifying straight lines in the X-Y plane using a three dimensional histogram, thereby it is possible to reduce the amount of memory which must be used, and also it is possible to shorten the processing time. Further, since it is arranged that, when detecting the horizontal plane which corresponds to the floor surface or the road surface, among the candidates for the plane which is to be detected, sorting of the four dimensional histogram is performed only using those candidates for which the angle of the perpendicular vector is within a predetermined range, thereby it is possible further to reduce the amount of memory which must be used, and also it is possible further to shorten the processing time. Yet further, since the detection processing for the vertical planes and for the horizontal planes is separated, and it is arranged that these operations can be performed simultaneously in parallel, thereby it becomes possible yet further to enhance the efficiency of processing. Moreover, since it is arranged that the movement of the robot is controlled while referring to the plane detection image and to the distance image, thereby, along with it being possible accurately to perform control of the position of the robot, it becomes possible to reduce the burden which the path selection processing imposes upon the robot, since it has become possible to shorten the processing time. Furthermore, since the sorting range is limited by using a mask, along with enabling shortening of the processing time, the accuracy of plane detection is enhanced.

It should be understood that it would also be acceptable for the program for implementing the functions of the processing section of FIGS. 2, 7 and 8 to be recorded upon a recording medium which can be read by a computer, and for the singular spot processing to be performed by this program which is thus recorded upon this recording medium being read by a computer system and being executed thereby. The term "computer system" is here to be understood as including an OS and hardware such as peripheral devices and the like. Further, if the www-system is taken advantage of, "computer system" should also be understood as including an environment offered by a home page (or a display environment). Further, by "recording medium which can be read by a computer", there is meant a portable medium such as a floppy disk, an opto-magnetic disk, a ROM, a CD-ROM or the like, or a storage device internal to a computer system such as a hard disk or the like. Yet further, this term "recording medium which can be read by a computer", is also intended to include a device which maintains the program for a certain time period, such as a volatile memory (RAM) internal to a computer system which operates as a server or a client when the program is transmitted via a network such as the internet or the like, or via a communication line such as a telephone line or the like.

It would also be acceptable for the above described program to be transmitted from a computer system which stores this program in a storage device or the like to another computer system via a transmission medium, or by a transmission wave within a transmission medium. Here, the term "transmission medium" which transmits the program device a medium which is endowed with the function of transmitting information, such as a network (communication net) such as the internet or the like, or a communication line (communication channel) such as a telephone line or the like. Further, it would also be acceptable for the above described program to be one for implementing a portion of the above described functions. Yet further, a so called differential file (differential program) which is able to implement the above described function in combination with a program which is already recorded in the computer system, would also be acceptable.

What is claimed is:

1. An image processing device for an autonomous robot or vehicle, comprising:

a distance image capture device which captures a distance image based upon three dimensional coordinate values obtained for various points upon environmental structure surfaces by measuring the distances to said points upon said environmental structure surfaces in the forward visual field of a distance sensor;

a plane detection device which detects planes from said three dimensional coordinate values upon said environmental structure surfaces obtained from said distance image;

an edge detection device which detects edges as spots where the distance abruptly changes from said distance image;

a singular spot decision device which decides whether or not said edges include singular spots, according to whether or not the edges which have been detected by said edge detection device and the planes which have been detected by said plane detection device satisfy predetermined conditions; and a singular spot map storage device which stores said singular spots as a singular spot map, based upon the results from said singular spot decision device for detecting singular spots, required for movement control when a robot or vehicle moves autonomously.

2. An image processing device according to claim 1, wherein said plane detection device comprises:

a vertical plane detection section which detects vertical planes in the distance image using a first mask which selects a pixel locating at a predetermined relative position with respect to a target pixel; and a horizontal plane detection section which detects horizontal planes using a second mask which selects two pixel locating at predetermined relative positions with respect to a target pixel.

3. An image processing device according to claim 2, wherein said vertical plane detection section reads out one frame data of said distance image, selects a target pixel and a pixel using said first mask, determines parameters regarding actual positions of said target pixel and said pixel, sorts said parameters into a three dimensional histogram, and detects vertical planes by repeating these steps while scanning said target pixel in said frame data.

4. An image processing device according to claim 2, wherein said horizontal plane detection section reads out one frame data of said distance image, selects a target pixel and two pixels using said second mask, determines parameters regarding actual positions of said target pixel and said pixels, sorts said parameters into a four dimensional histogram, and detects vertical planes by repeating these steps while scanning said target pixel in said frame data.

5. A vehicle movement control device comprising an image processing device according to claim 1, wherein said vehicle movement control device comprises a movement control device which, during vehicle movement, performs movement control by referring to said singular spot map.

6. An autonomously moving robot comprising an image processing device according to claim 1, wherein said autonomously moving robot comprises a movement control device which, during robot movement, performs movement control by referring to said singular spot map.

7. A plane detection method, comprising:

distance image capture processing which captures a distance image based upon three dimensional coordinate values obtained for various points upon environmental structure surfaces by measuring the distances to said points upon said environmental structure surfaces in the forward visual field of a distance sensor;

plane detection processing which detects planes from said three dimensional coordinate values upon said environmental structure surfaces obtained from said distance image;

edge detection processing which detects edges from said distance image by extracting spots where the distance abruptly changes; and singular spot decision processing which decides whether or not said edges include singular spots, according to whether or not the edges which have been detected by said edge detection device and the planes which have been detected by said plane detection device satisfy predetermined conditions.

8. A plane detection method according to claim 7, wherein said plane detection processing comprises the steps of:

reading out one frame data of said distance image;

selecting a target pixel and a pixel locating at a predetermined relative position with respect to a target pixel using a first mask;

determining parameters regarding actual positions of said target pixel and said pixel;

sorting said parameters into a three dimensional histogram; and detecting vertical planes by repeating these steps while scanning said target pixel in said frame data.

9. A plane detection method according to claim 7, wherein said plane detection processing comprises the steps of:

reading out one frame data of said distance image;

selecting a target pixel and two pixels locating at predetermined relative positions with respect to a target pixel using a second mask;

determining parameters regarding actual positions of said target pixel and said pixels;

sorting said parameters into a four dimensional histogram; and detecting horizontal planes by repeating these steps while scanning said target pixel in said frame data.

10. A recording medium which can be read by a computer, upon which is recorded a singular spot detection program which detects singular spots in a forward visual field, wherein said singular spot detection program causes said computer to perform:

distance image capture processing which captures a distance image based upon three dimensional coordinate values obtained for various points upon environmental structure surfaces by measuring the distances to said points upon said environmental structure surfaces in the forward visual field of a distance sensor;

plane detection processing which detects planes from said three dimensional coordinate values upon said environmental structure surfaces obtained from said distance image;

edge detection processing which detects edges from said distance image; and singular spot decision processing which decides whether or not said edges include singular spots, according to whether or not the edges which have been detected by said edge detection device and the planes which have been detected by said plane detection device satisfy predetermined conditions.

* * * * *